Hampson & Ladue,
Double-Acting Pump,

Nº 47,299.    Patented Apr. 18, 1865.

UNITED STATES PATENT OFFICE.

JOSEPH HAMPSON AND GEORGE LADUE, OF NEWBURG, NEW YORK.

IMPROVEMENT IN PUMPS.

Specification forming part of Letters Patent No. 47,299, dated April 18, 1865.

*To all whom it may concern:*

Be it known that we, JOS. HAMPSON and GEO. LADUE, of Newburg, in the county of Orange, in the State of New York, have invented a new and useful Improvement on Pumps; and we do hereby declare that the following is a full, clear, and exact description of the construction and operation of the same, reference being had to the annexed drawings, making a part of this specification, in which—

Figure 1:
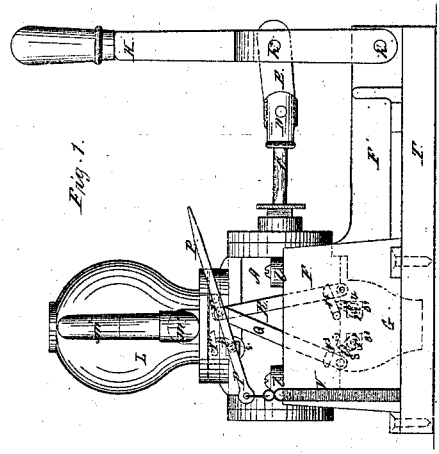
Figure 5:
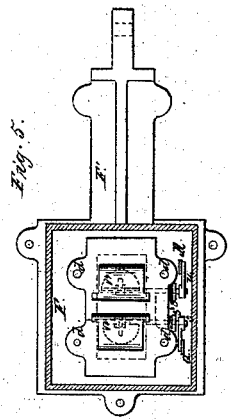
Figure 3:
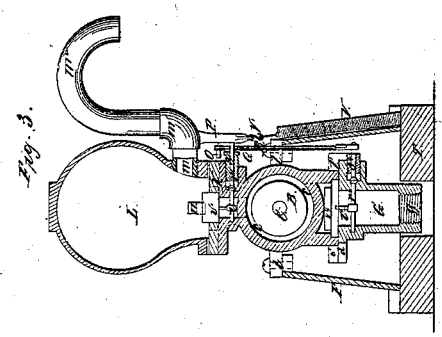
Figure 2:
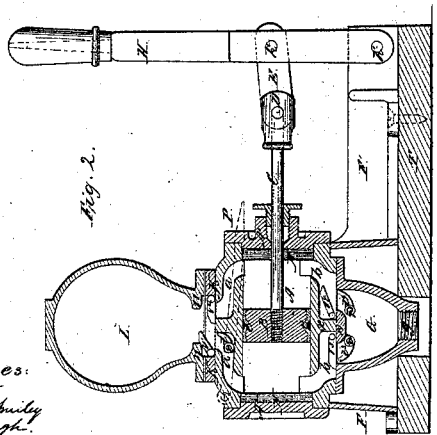
Figure 4:
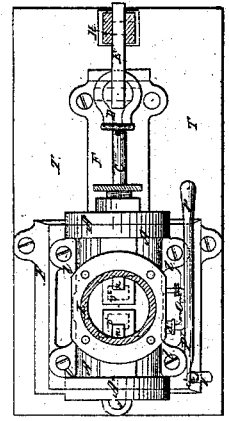

Figure 1 is a side elevation. Fig. 2 is a longitudinal section. Fig. 3 is a transverse section. Fig. 4 represents a top view or plan. Fig. 5 represents a horizontal section.

A is the pump-cylinder; $A'$ and $A^2$, the cylinder-heads; B, the piston, which is to be worked by hand, as shown in the drawings, or by any other power. The piston is connected by the piston-rod C, cross-head D, and link E with handle or lever H, the fulcrum of which is on the end of bed-plate F. The pump-cylinder rests on and is fastened by lugs $l\ l$ to a bed-plate, F, which surrounds the lower part of the cylinder and the suction-pipe G with both suction-valves $v^3$ and $v^4$. On top of the cylinder are the discharge-valves $v'$ and $v^2$, and above these an air-vessel, L, on the front of which is fastened the discharge-pipe $m\ m'\ m^2$. Below the discharge-valve $v'$ is a small rod, $r'$, on which is fastened a cog, $i$, which lifts the valve $v'$ from its seat or lets the valve come down to the seat by turning the rod $r'$ one way or the other. Below each suction-valve $v^3$ and $v^4$ is a rod, $r^3$ and $r^4$, like the rod $r'$, by which the valves $v^3\ v^4$ can be lifted from their seats by means of the cogs $i^3\ i^4$. These rods $r'\ r^3\ r^4$ are fitted in their journals air-tight by small brass stuffing-boxes $s'\ s^3\ s^4$. All three rods are connected to each other by means of a rod, $P\ P'$, and connecting-links Q R. The rod $r'$ is fastened direct to the rod P and is the same time a resting-point for the rod $P\ P'$. A small arm, S, is fastened to the rod $r^3$, and another arm, U, to the rod $r^4$. The links Q and R connect these levers or arms S U to a pin, O, on the rod $P\ P'$, the same distance from $r'$ as the levers S and U are long. One end of the rod $P'$ is connected to a spiral spring, V, fastened to the wooden bed-plate T. This spring V draws the end $P'$ down, by which action the pins $r'\ r^3\ r^4$ are turned so that the three cogs $i'\ i^3\ i^4$ lift the valves $v'\ v^3\ v^4$ and keep them lifted from their seats, as shown in Fig. 1. All water or any other fluid which is in the pump goes back through the cylinder and valves in the suction-pipe and well, from where it was drawn.

When the rod $P\ P'$ is pressed down on the other end, P, and kept in this position, as shown in Fig. 2, the rods $r'\ r^3\ r^4$ are turned in the other direction, the valves $v'\ v^3\ v^4$ come down on the valve-seats, and the pump is in working order.

Fig. 2 shows the pump working. Suction-valve $v^4$ and discharge-valve $v'$ are open. The other valves, $v^2\ v^3$, are shut. The fingers $i'\ i^3\ i^4$ are put in such positions that they allow free working of the valves.

As soon as the pressure on the end of rod P ceases to exist, the spring V pulls the rod $P'$ down, the cogs lift the valves, and the remaining water in the pump falls back in the well.

The piston in the pump is a solid cast-iron plunger, covered on its circumference with brass. This brass is put on the piston by simply pressing a piece brass tube in one or more grooves, which are turned in the piston and around the rounded edges of the cast-iron piston. Is the piston worn out so that a new piston is required, the old one is soon renewed by cutting off the old brass cover and putting on a new brass tube, which work is very soon done in a lathe.

Inside the cylinder, on each end, is put a thick india-rubber plate, N N, Fig. 2, kept in their places by the cylinder-heads. The cylinder is bored wider on both ends, to give sufficient shoulder for these rubber plates to rest on. The parts of the cylinder-heads which go in the cylinder press the plates on these shoulders and keep them in their places. These rubber plates allow the piston to be worked close to the ends of the cylinder, and prevent breaking the piston or the heads by pushing the piston against the india-rubber the same time each stroke of the piston gives the full capacity of the cylinder when worked close to the india-rubber plates.

What we claim as our invention, and desire to secure by Letters Patent, is—

1. The arrangement to lift both suction-valves and one discharge-valve by means of small cogs below the valves, connected by the rods $r'$ $r^3$ $r^4$ to the one main rod P P', and by a spiral spring applied to the rod P P', as specified.

2. In combination therewith a solid piston, having an exterior of brass attached, as herein specified.

3. The application of india-rubber plates on the inside of the cylinder-heads, so as to form a packing and a cushion for the piston, all substantially as shown and described.

JOSEPH HAMPSON.
GEO. LADUE.

Witnesses:
CHAS. T. TITUS,
WILLIAM E. SMILY,
A. DAREAGH.